United States Patent
Tompkins et al.

(10) Patent No.: US 10,662,654 B2
(45) Date of Patent: *May 26, 2020

(54) FOLDING STAIRCASE

(71) Applicant: MORryde International, Inc., Elkhart, IN (US)

(72) Inventors: Gary E. Tompkins, Mishawaka, IN (US); Anthony J. Granzotto, Constantine, MI (US)

(73) Assignee: MORryde International, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,517

(22) Filed: Jul. 3, 2018

(65) Prior Publication Data

US 2018/0305934 A1    Oct. 25, 2018

Related U.S. Application Data

(63) Continuation of application No. 15/877,493, filed on Jan. 23, 2018, now Pat. No. 10,219,671, which is a continuation-in-part of application No. 15/615,102, filed on Jun. 6, 2017, now Pat. No. 9,903,121.

(60) Provisional application No. 62/346,230, filed on Jun. 6, 2016.

(51) Int. Cl.
| | |
|---|---|
| *B60R 3/02* | (2006.01) |
| *E04F 11/06* | (2006.01) |
| *B61D 23/02* | (2006.01) |
| *E06C 9/08* | (2006.01) |
| *E06C 5/04* | (2006.01) |

(52) U.S. Cl.
CPC ............. *E04F 11/064* (2013.01); *B60R 3/02* (2013.01); *B61D 23/02* (2013.01); *E06C 5/04* (2013.01); *E06C 9/08* (2013.01)

(58) Field of Classification Search
CPC ................ E06C 9/06; E06C 9/08; B60R 3/02
USPC .............................................. 182/97
See application file for complete search history.

(56) References Cited

U.S. PATENT DOCUMENTS

| | | | |
|---|---|---|---|
| 1,542,775 A | 6/1925 | Husted | |
| 2,037,805 A * | 4/1936 | Lindstedt | B61D 23/02 105/447 |
| 2,951,454 A | 9/1960 | Candlin, Jr. | |
| 2,960,182 A | 11/1960 | Swanson | |
| 2,990,148 A | 6/1961 | James | |

(Continued)

FOREIGN PATENT DOCUMENTS

DE    2444552 A1 *    4/1976    ............... B60R 3/02

*Primary Examiner* — Alvin C Chin-Shue
(74) *Attorney, Agent, or Firm* — Botkin & Hall, LLP

(57) ABSTRACT

A folding staircase for use in a door opening having a threshold. The folding staircase has a pair of stringers that have an upper end and a lower end that is adapted for contacting a ground surface. The stringers are spanned by at least one tread. A hinge is connected to a floor near the door opening and a threshold plate pivotally connected thereto is movable between a use position and a stowed position. The staircase may be provided with a lifting mechanism that biases the staircase and threshold plate toward their stowed positions. The lifting device provides a variable force that provides more rotational force when the staircase would require a user to bear more of its weight and less force when less of the weight of the staircase would be borne by a user.

4 Claims, 20 Drawing Sheets

(56) References Cited

U.S. PATENT DOCUMENTS

| | | | |
|---|---|---|---|
| 3,137,763 A | 6/1964 | Jones | |
| 3,176,334 A * | 4/1965 | Lovdahl | B60R 3/02 14/71.1 |
| 3,392,990 A * | 7/1968 | Wolf | B60R 3/02 280/163 |
| 3,507,515 A * | 4/1970 | Brammer | B60R 3/02 280/166 |
| 3,544,153 A * | 12/1970 | Munn | B60J 5/14 296/51 |
| 3,750,737 A | 8/1973 | Woodward | |
| 3,853,369 A | 12/1974 | Holden | |
| 3,955,827 A | 5/1976 | Wonigar | |
| 3,980,319 A * | 9/1976 | Kirkpatrick | B60R 3/02 280/166 |
| 3,997,211 A | 12/1976 | Graves | |
| 4,014,486 A | 3/1977 | Nelson et al. | |
| 4,068,770 A * | 1/1978 | Boehringer | B60R 3/02 14/71.1 |
| 4,084,713 A * | 4/1978 | Rohrs | A61G 3/061 14/69.5 |
| 4,161,769 A | 7/1979 | Elliott | |
| 4,161,997 A | 7/1979 | Norman | |
| 4,216,725 A | 8/1980 | Hallam | |
| 4,394,718 A | 7/1983 | Balzer | |
| 4,425,984 A | 1/1984 | Lachance | |
| 4,456,095 A | 6/1984 | Hodson | |
| 5,028,063 A | 7/1991 | Andrews | |
| 5,085,290 A | 2/1992 | Guirlinger | |
| 5,117,940 A | 7/1992 | Garelick | |
| 5,228,707 A | 7/1993 | Yoder | |
| 5,395,075 A | 3/1995 | Sprenger et al. | |
| 5,397,143 A | 3/1995 | Bird | |
| 6,116,378 A * | 9/2000 | Barrow | B60R 3/02 182/127 |
| 6,135,526 A | 10/2000 | Reckner, Jr. | |
| 6,425,572 B1 | 7/2002 | Lehr | |
| 6,612,596 B2 | 9/2003 | Jeon et al. | |
| 6,948,588 B1 * | 9/2005 | Chustak | B63B 27/146 114/362 |
| 7,055,838 B2 | 6/2006 | Lambie | |
| 8,162,273 B2 | 4/2012 | Jones | |
| 8,573,673 B1 | 11/2013 | Puglisi, Sr. | |
| 8,720,643 B1 | 5/2014 | Adair | |
| 8,997,411 B2 | 4/2015 | Whitten et al. | |
| 9,771,025 B1 * | 9/2017 | Nebel | B60R 3/02 |
| 2008/0022611 A1 | 1/2008 | Bird | |
| 2008/0190049 A1 | 8/2008 | Muti | |
| 2008/0210338 A1 | 9/2008 | Ponce | |
| 2009/0273154 A1 | 11/2009 | Kuula | |
| 2010/0251926 A1 | 10/2010 | Tomada | |
| 2014/0345974 A1 | 11/2014 | Nebel et al. | |
| 2018/0009386 A1 * | 1/2018 | Nebel | B60R 3/02 |

\* cited by examiner

FOLDING STAIRCASE

CROSS REFERENCE TO RELATED APPLICATIONS

This application is a continuation claiming the benefit of a continuation-in-part application Ser. No. 15/877,493 filed Jan. 23, 2018, which claims the benefit of Utility application Ser. No. 15/615,102 filed Jun. 6, 2017, which claims the benefit of U.S. Provisional Application No. 62/346,230, filed Jun. 6, 2016, the disclosures of which are hereby incorporated by reference.

BACKGROUND OF THE INVENTION

Folding staircases for recreational vehicles (RVs) are necessary for easily entering and exiting the RV. Typically, RVs which can be towable units or motorhomes are well above the ground upon which they rest. Previous staircases to facilitate movement to and from RVs have been unwieldy for various reasons. In some cases, steps that fold out of RVs do not span from the RV to the ground, but remain suspended above the ground. These types of steps therefore fail to provide a sturdy and consistent path to the ground because they remain somewhat independently held above the adjacent ground, which may or may not have a slope. Other steps include multiple linkages and moving parts and only unfold with great effort on the part of a user. There is a need for RV steps that require little effort of their user and provide a steady consistent path to the ground upon which the RV rests.

SUMMARY OF THE INVENTION

The present invention is a folding staircase that is adapted for use in a door opening. The door opening is in a wall that has an inner wall surface that is located within an indoor space and an outer wall surface that is located in an outdoor space. The door opening receives a door that separates the indoor space from the outdoor space.

The folding staircase has a pair of stringers that are spanned by at last one tread. Each of the stringers has an upper edge and a lower edge, an upper end and a lower end. The lower end is adapted for contacting a ground surface. The upper end is for abutting the outer wall surface. A hinge is adapted for being mounted to a floor within the indoor space and is spaced from the threshold. A threshold plate is connected to the hinge. The threshold plate is pivotable between a use and a stowed position. The threshold plate has a first ramped portion that is adapted to reach a distance that is at least the height that the threshold is above the floor. This enables the threshold plate to span over the threshold in its use position. The first ramped portion continues into a spanning portion that is adapted for directly overlying the threshold and spanning between the inner wall surface and the outer wall surface when the threshold plate is in its use position. The spanning portion continues into an offsetting portion that is substantially parallel to the outer wall surface and adjacent to the threshold when the threshold plate is in its use position. The threshold plate aligns the upper end of the stringers adjacent to the outer wall surface when the threshold plate is in its use position.

In another aspect of the invention, the staircase may be provided with a lifting mechanism that assists moving the staircase from its use to its stowed position. The lifting mechanism provides a biasing rotational force upon the threshold plate and staircase toward the stowed position.

DESCRIPTION OF THE PREFERRED EMBODIMENT

Figure 1:
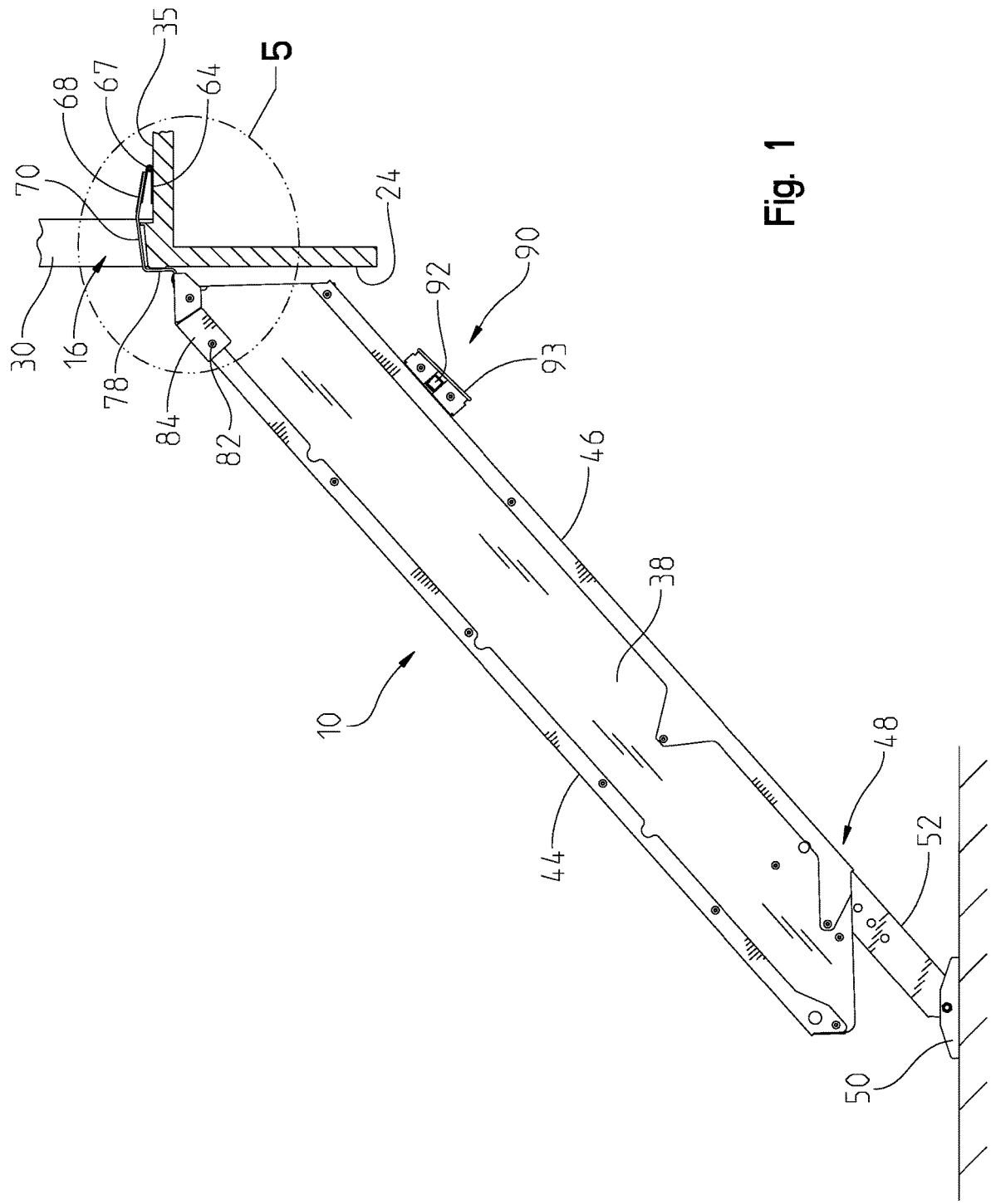
FIG. 1 is side view of the staircase with a sectional view through the door frame and floor with the staircase and threshold plate in the use position.
Figure 5:
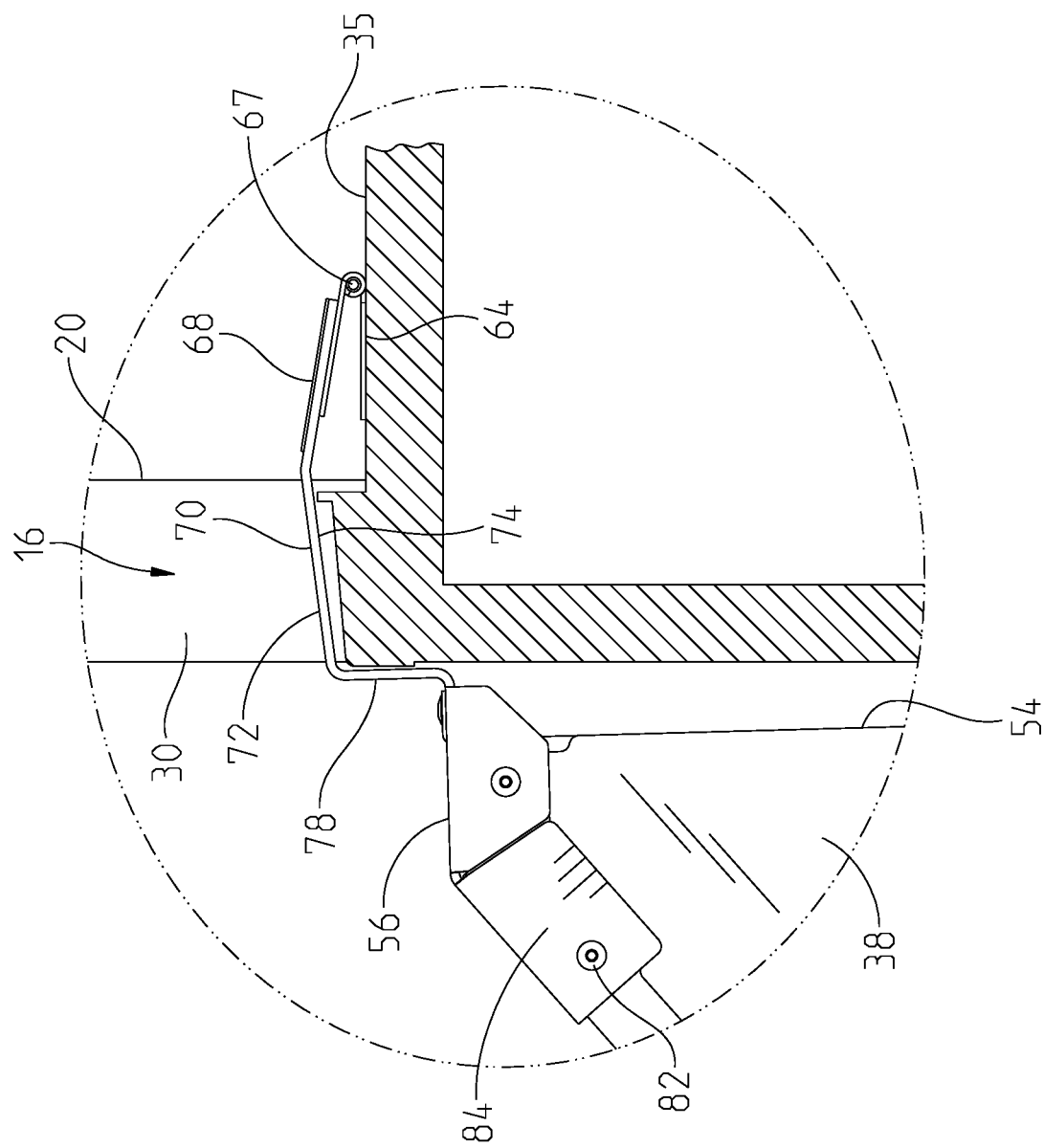
FIG. 5 is a magnified view of area 5 in FIG. 1.

The folding staircase 10 of the present invention is shown in FIG. 1. The folding staircase 10 is for use in a door opening 16 within a wall 18 that has an inner wall surface 20 that is located within an indoor space 22 and an outer wall surface 24 that is located in an outdoor space 26. The door opening 16 receives a door 19 that is pivotable between an open position shown in FIG. 16 and a closed position shown in FIG. 18. The door opening 16 includes a door frame 17 having a threshold 27 and vertical door jambs 30 that span from the outer wall surface 24 to the inner wall surface 20 within the door opening 16. The jambs 30 are the vertical portions of the door frame 17 lining the door opening 16 and are best shown in FIG. 5 and have metal door stops 31 that are extensions from the jambs 30 extending along the vertical sides of the door opening 16. The indoor space is defined by the space behind the metal door stops 31 on which the inner surface 23 door rests when closed. Within the indoor space 22 a floor 35 defines the lowermost portion of the indoor space 22 and the threshold 27 rises above the floor 35.

The folding staircase 10 has a pair of stringers 38 that are spaced parallel to each other and are spanned by treads 40. The treads 40 may be affixed mechanically to their respective stringers 38 or welded to the stringers 38 and in the staircase 10 shown in FIG. 5, the treads 40 are bolted to the stringers 38. Each of the stringers 38 has an upper edge 44 and a lower edge 46. The stringers 38 each have a lower end 48 that includes a pivotal foot 50 that is pivotally affixed to an adjustable leg 52. In some instances having a pivotal foot 50 near the lower end is not necessary. The stringers 38 have an upper end 54 that is adapted for abutting the outer wall surface 24. Adjacent to the upper end 54 is a truncated upper surface 56 that is perpendicular to the upper end 54 of the stringers 38. The upper end 54 is designed to be held adjacent to and abutting the outer wall surface 24, but not touching it. This is shown in FIG. 1.

Figure 6:
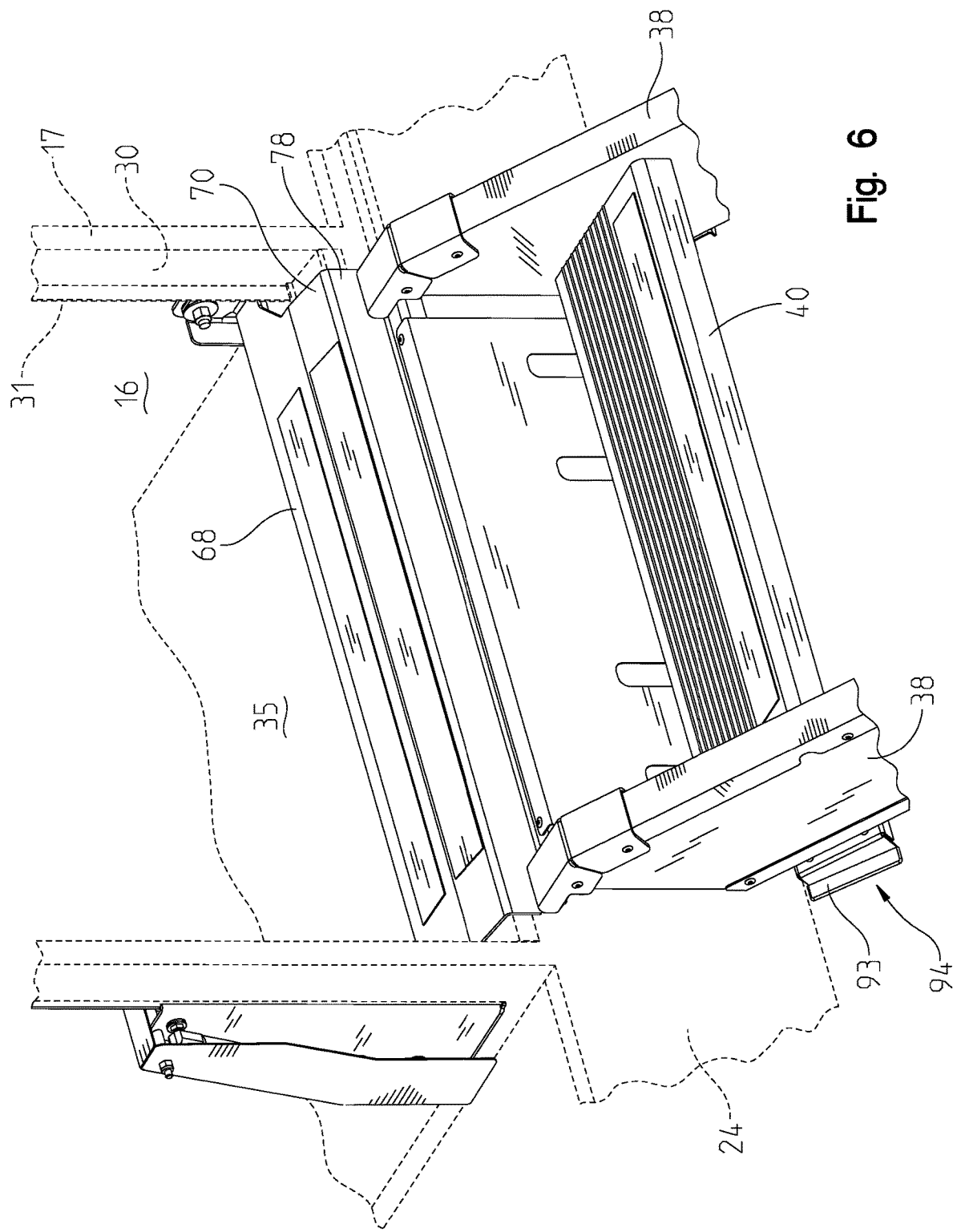
FIG. 6 is a perspective view of the staircase shown in FIGS. 1-5 in its use position showing the area adjacent to the threshold.

A hinge 60 is connected near the upper end 54 of the stringers 38 and to the floor 35. The hinge 60 includes a floor mounting portion 64 and a threshold plate 66 that pivots about a pivot axis 67 with respect to the floor mounting portion 64. The floor mounting portion 64 is adapted to be mounted to the floor 35 as shown in FIG. 1. The floor mounting portion 64 is mounted on one the side of the door 19 locating it within the indoor space 35. The threshold plate 66 has a first ramped portion 68 that is adapted to reach upwardly to the distance the threshold 27 rises above the floor 35. The first ramped portion 68 continues into a spanning portion 70 that is adapted to directly overlie the threshold 27 as shown in FIGS. 1 and 6. The spanning portion 70 has an upper surface 72 and a lower surface 74. The lower surface 74 may be spaced above the threshold 27 by a predetermined amount. This spacing above the threshold 27 is shown in FIG. 5. Spacing the lower surface 74 above the threshold 27 is not required and the threshold plate 66 is designed so that the door 19 may be closed over the threshold plate 66 when it spans across the threshold 27. The spanning portion 70 continues into an offsetting portion 78 that extends downwardly from the spanning portion 70. The offsetting portion 78 is adapted to be parallel to the outer wall surface 24 and when the threshold plate 66 is in the position shown in FIG. 1. The offsetting portion 78 continues into a mounting portion 80 that is perpendicular to it. The mounting portion 80 is mounted adjacent to the truncated upper surface 56 of the stringers 38. This may be accomplished by mechanical fasteners 82 such as bolts or rivets driven through lateral tabs 84 extending from the mounting portion 80. All of the mounting of the staircase 10 is done within the indoor space 22 of the vehicle and the staircase 10 requires no attachment to any part of the structure to which it is connected. The floor mounting portion 64 is mounted completely within the indoor space 22. In other words, no attachment is made beyond the inner wall surface 20.

Figure 2:
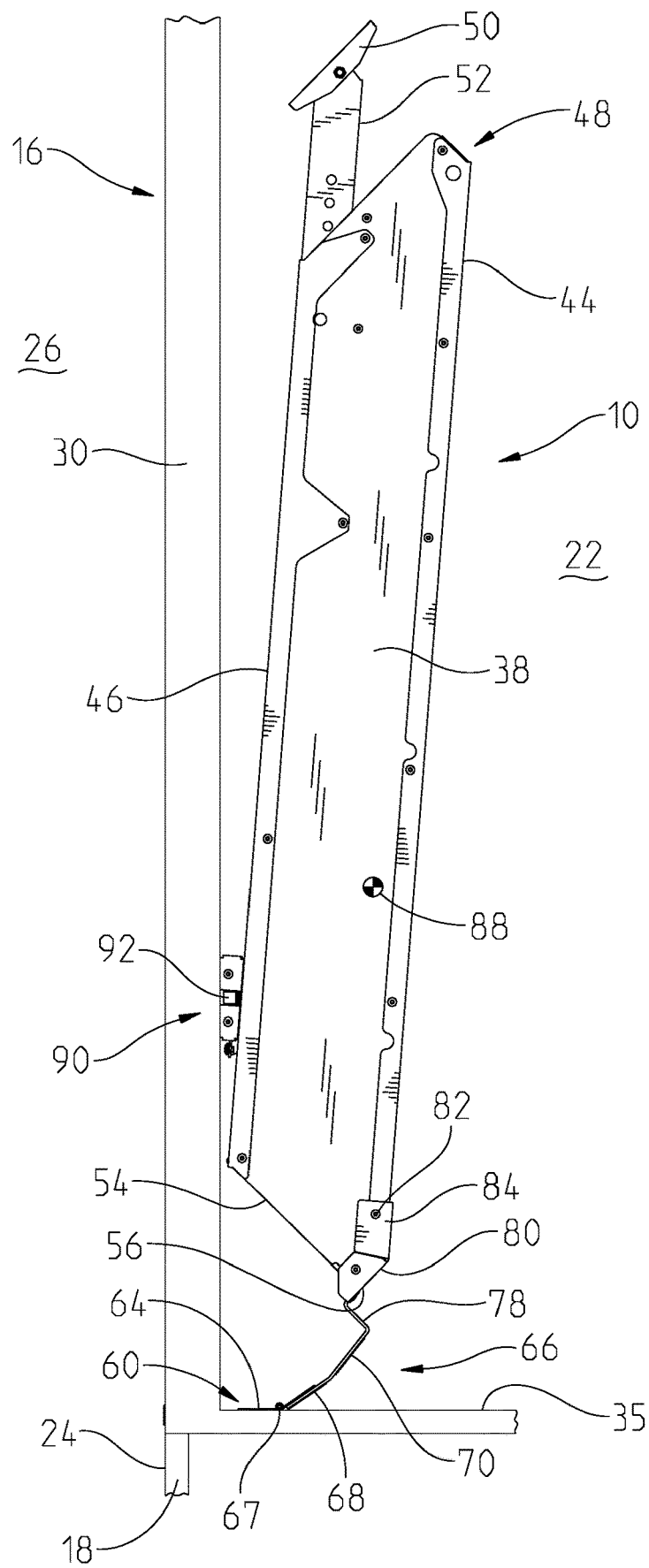
FIG. 2 is a side view with a sectional view through the door frame and floor with the staircase in FIG. 1 and threshold plate in the stowed position.
Figure 3:
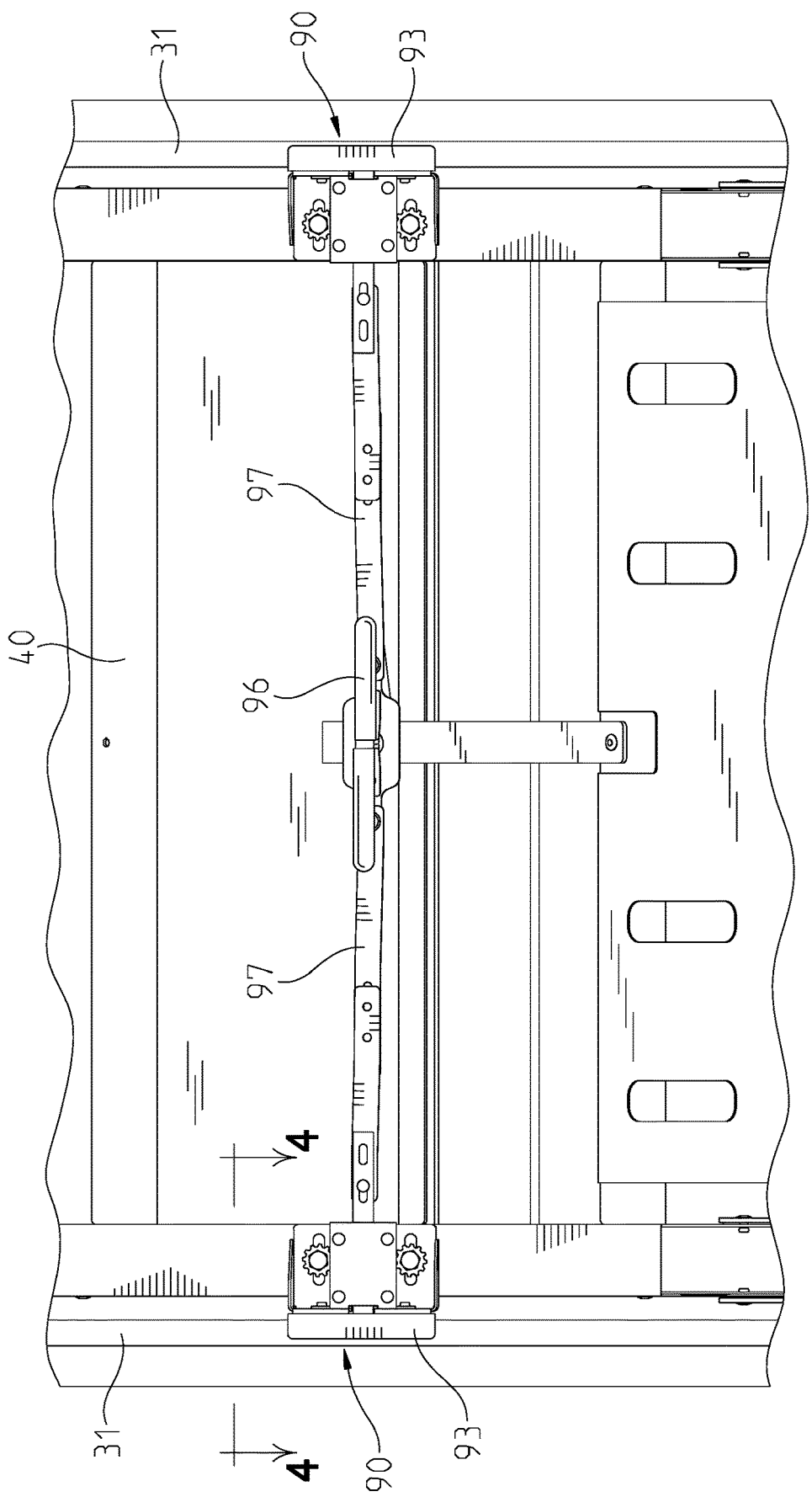
FIG. 3 is a front view of the staircase shown in FIGS. 1 and 2 in its stowed position.
Figure 10:
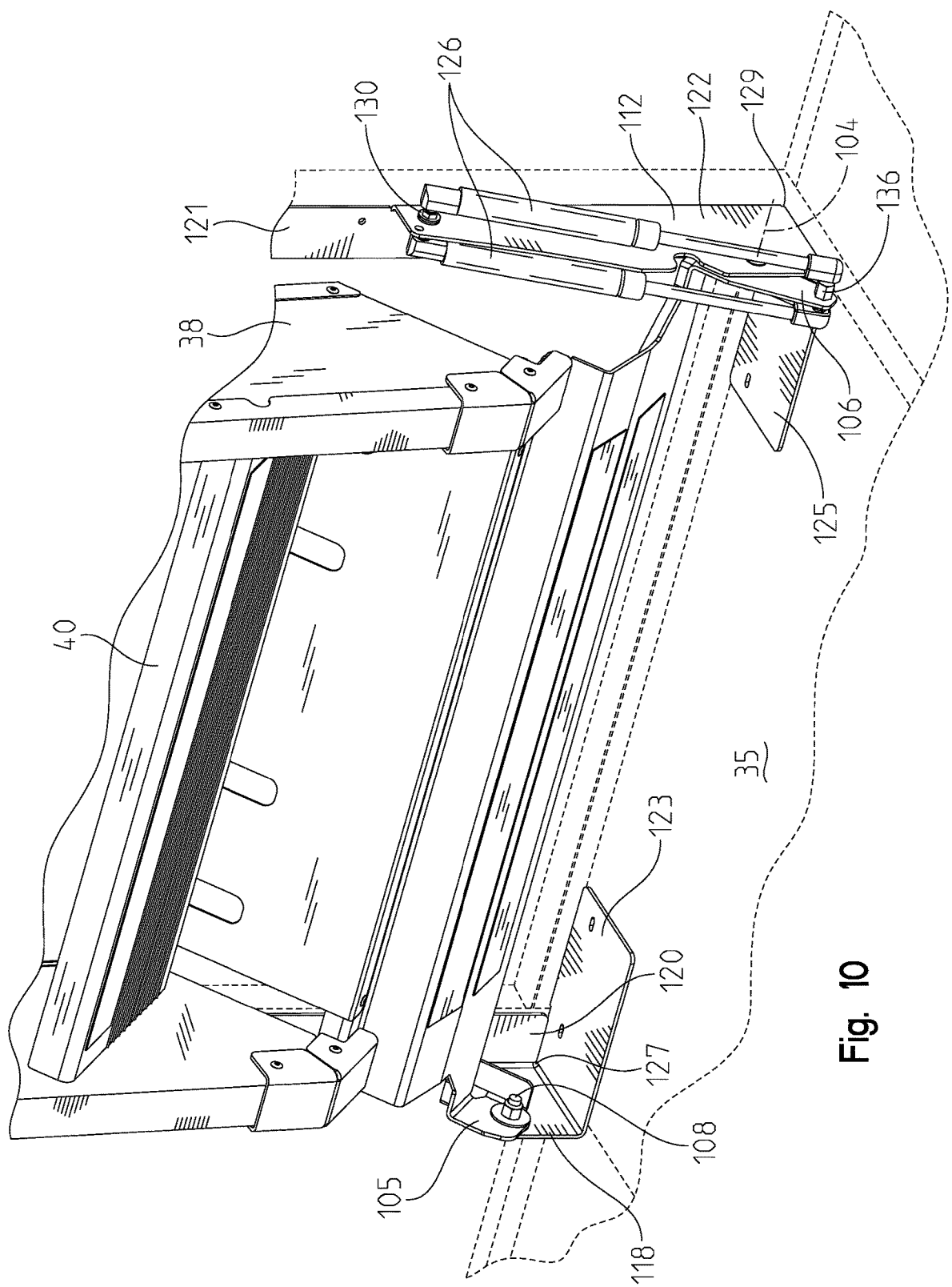
FIG. 10 is a perspective view of the staircase in FIGS. 7-9 in the stowed position.
Figure 11:
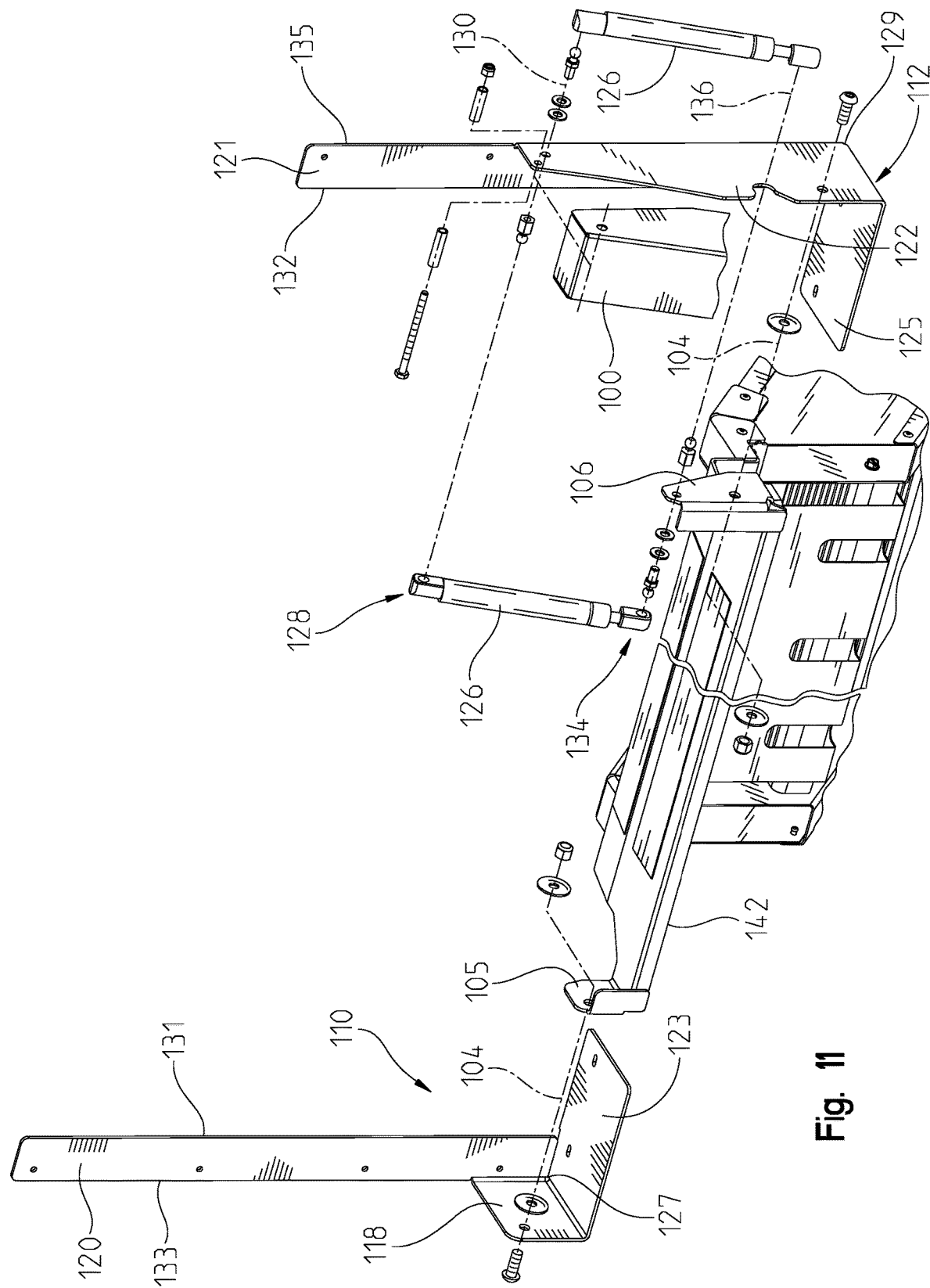
FIG. 11 is an exploded perspective view of the staircase shown in FIGS. 7-10.

The hinge 60 and staircase 10 have a use position that corresponds to the position shown in FIGS. 1 and 6, and a stowed position shown in FIGS. 2 and 10. In the use position, the stringers 38 are located below the threshold 27, the threshold plate 66 spans the threshold 27 and extends from the indoor space 22 to the outdoor space 26. When the staircase 10 is in its stowed position it is positioned so the staircase 10 fits completely within the lateral boundaries of the door opening 16 and locates the staircase 10 on the same side of the door 19 as the floor mounting portion 64. In the stowed position, the lower edge 46 of the stringers 38 are located completely with the indoor space 22 and are inside the door jambs 30. In this position, the center of gravity 88 for the staircase 10 is located inward of the pivot axis 67. As such, the staircase 10 is biased inward. The stringers 38 have locking mechanisms 90 that are located near their lower edges 46. The locking mechanisms 90 have locking pins 92 that are biased outward with a spring and a stop bracket 93. Each locking pin 92 has an extended position shown in FIGS. 3 and 4 and a retracted position in which the locking pin 92 is retracted within the locking mechanism 90. The locking pins 92 have an inclined surface that is adapted to strike the door stop 31 when the staircase 10 is moved from its use position to its stowed position and this pushes the locking pins 92 inward to clear the door stops 31. Once the locking pins 92 pass the door stops 31 they extend behind it as shown in FIG. 5 to lock the staircase 10 in place. The locking pins 92 may be retraced by twisting a handle 96 that pulls on release linkages 97, which retract the pins 92. When the staircase 10 is in its stowed position it is biased to rest upon the stop brackets 93 that prevent the staircase 10 from falling inward.

Figure 7:
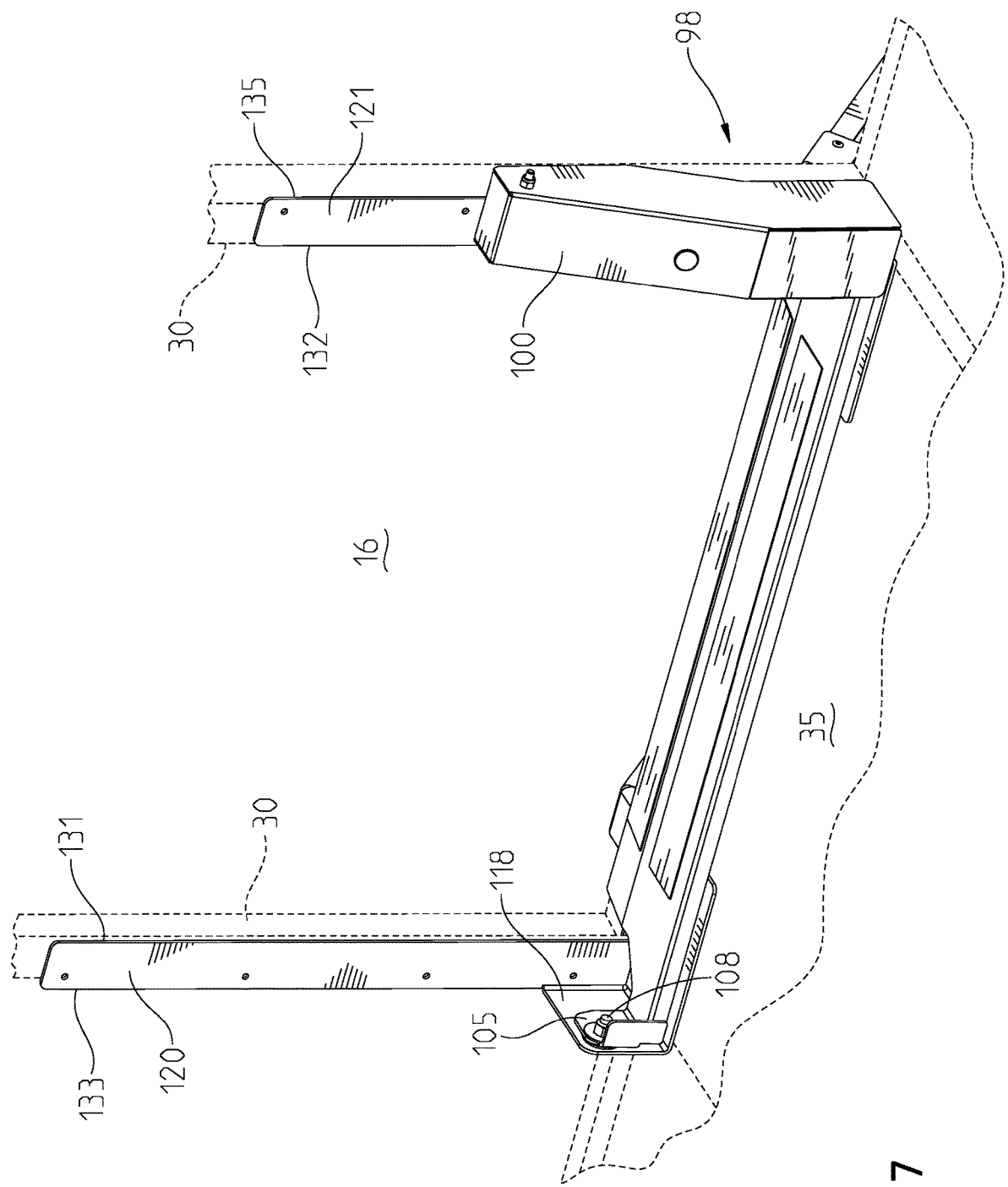
FIG. 7 is a perspective view of a staircase with a lifting device as seen from the indoor space with the staircase in its use position.
Figure 8:
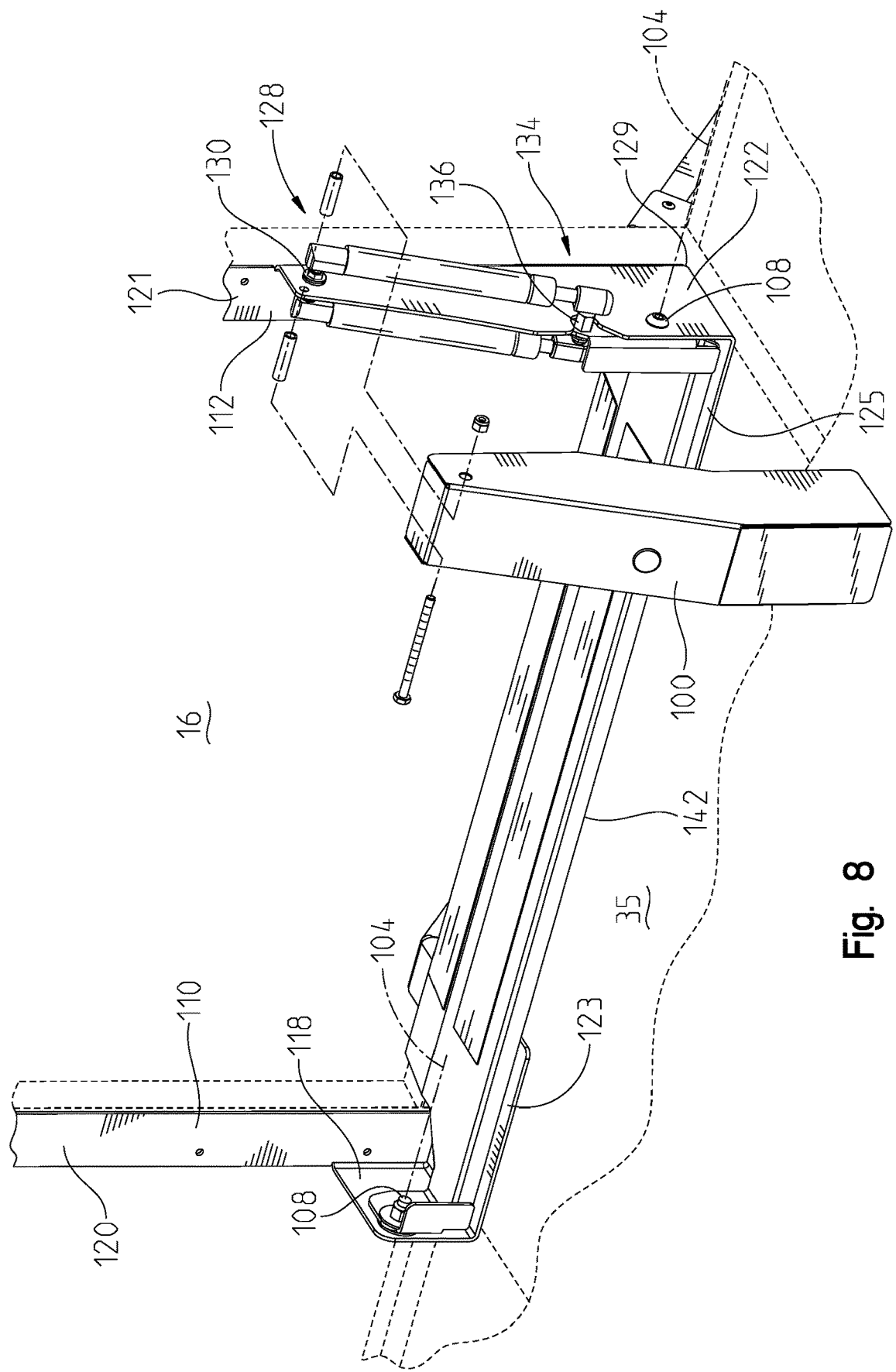
FIG. 8 is a perspective view of the staircase shown in FIG. 7, with the staircase in its use position.
Figure 9:
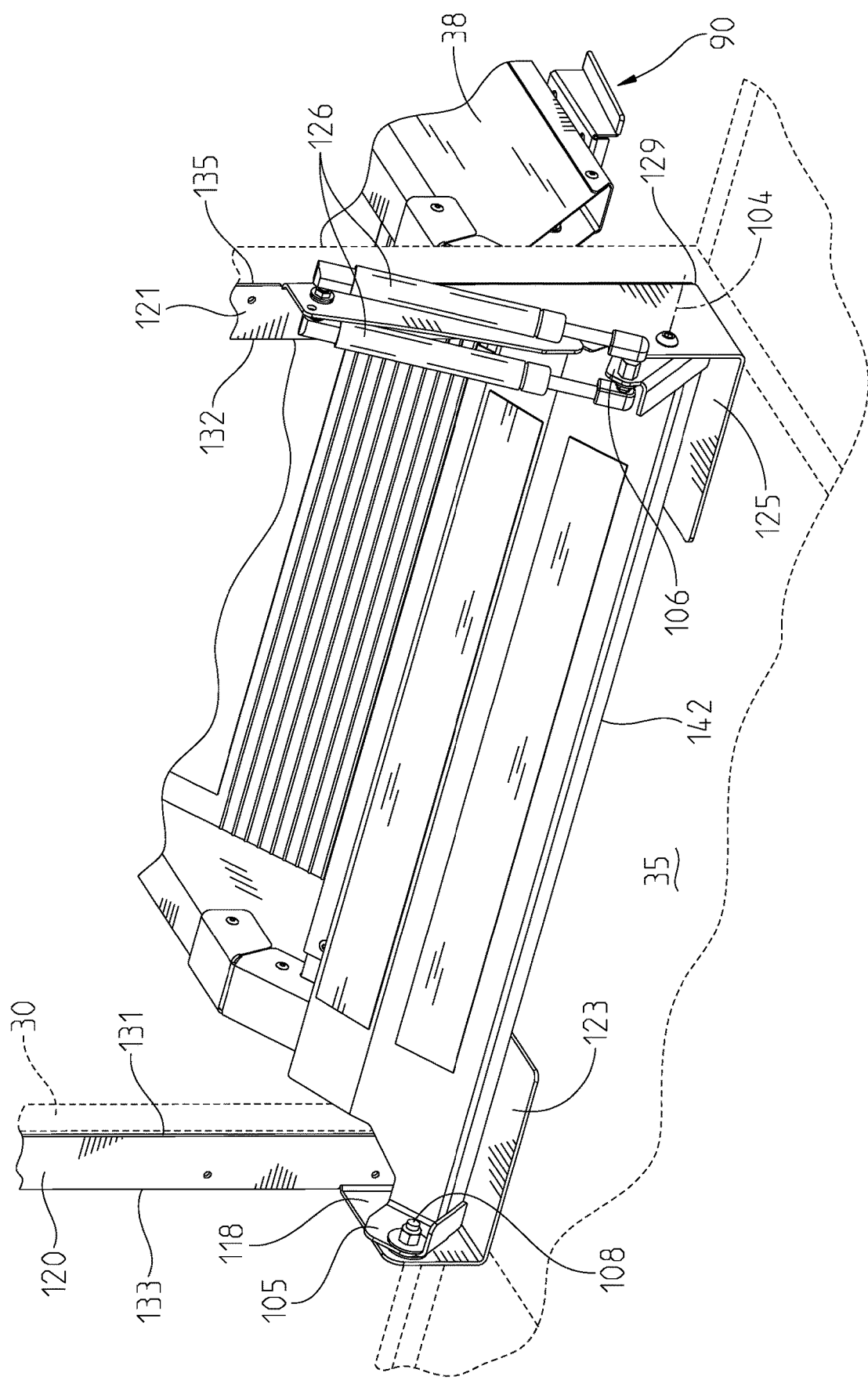
FIG. 9 is a perspective view of the staircase in FIGS. 7 and 8 with the staircase between its use and stowed position.

The folding staircase 10 may also be assisted through the use of a lifting device 98 that reduces the force necessary to move the staircase 10 from its use position to its stowed position. The lifting device 98 is shown in FIG. 7 as viewed from the indoor space. The lifting device 98 has a cover 100 that is shown removed in FIG. 8. In the embodiment shown in FIGS. 6-11, a threshold plate 102 has a first hinge flange 105 and a second hinge flange 106. The first and second hinge flanges 105, 106 are positioned such that they extend beyond the door jambs 30 and obstruct no portion of the door opening 16. The hinge flanges 105, 106 define the ends of the threshold plate 102. The threshold plate 102 pivots about pivot axis 104 that acts as a hinge for the threshold plate 102 and the pivot axis 104 is defined by the central axis of two bolts 108 extending through the hinge flanges 105, 106 of the threshold plate 102. The bolts 108 also extend through corresponding opposing first and second hinge flanges 118 and 122 on first and second mounting brackets 110, 112 that are affixed within the indoor space 22. The first and second mounting brackets 110, 112 function as the floor mounting portion 64 and the mounting brackets 110, 112 are mounted completely within the indoor space 22. The first and second mounting brackets 110, 112 cooperate with the threshold plate 102 to function as a hinge that pivots about axis 108. The first mounting bracket 110 is shown on the left side in FIG. 8 and the second mounting bracket 112 is shown on the right side. The mounting brackets 110, 112 have corresponding wall mounting flanges 120 and 121. The first wall mounting flange 120 is perpendicular to the first hinge flange 118 on the first mounting bracket 110. The second wall mounting flange 121 is perpendicular to the second hinge flange 122 on the second mounting bracket 112. Each mounting bracket 110, 112 has a floor flange 123, 125 that is for fastening the mounting brackets 110, 112 to the floor 35. On the first mounting bracket 110, the first wall mounting flange 120, first hinge flange 118 and first floor flange 123 are all perpendicular with respect to each other and are all joined to form a rigid corner 127. On the second mounting bracket 112, the second wall mounting flange 121, second hinge flange 122 and second floor flange 125 are all perpendicular with respect to each other and are joined to form a rigid corner 129. As such, the mounting brackets 110, 112 are extremely rigid yet light weight. Each mounting flange 110, 112 has an inner edge 131, 132 and an outer edge 133, 135 respectively. Each hinge flange 118, 122 extends from the outer edge 133, 135 of its corresponding wall mounting flange 120, 121. As such, the mating hinge flanges 105, 106 of the threshold plate 102 are maintained offset from the door jambs 30 because the inner edges 131 and 132 are typically aligned with or slightly inset from the edges of the door opening 16. In other words, the inner edges 131, 132 are slightly inset or aligned with the door jambs 30. The hinge flanges 105, 106 of the threshold plate 102 are located between the inner edges 131, 132 and outer edges 133, 135 of the wall mounting flanges 120, 121. The threshold plate 102 spans across the threshold 27 to the outdoor space 26 and is joined to the stringers 38 near the upper ends 54 of the stringers 38. The pivot axis 104 extends through both hinge flanges 105, 106 so that the threshold plate 102 can pivot with respect to the door frame 17 and the pivot axis 104 is fixed with respect to the door frame 17. The hinge flanges 105, 106 of the threshold plate 102 pivotally ride between the hinge flanges 118, 122 on the mounting brackets 110, 112. The hinge flanges 118, 122 on the mounting brackets 110, 112 pivotally retain the entire threshold plate 102. Because the hinge flanges 105, 106 of the threshold plate pivot between the hinge flanges 118, 122 of the mounting brackets, the threshold plate 102 is restrained from axial movement while allowing it to pivot about the pivot axis 104. All of the mounting of the staircase 10 via the mounting brackets 110, 112 is done within the indoor space 22 of the vehicle and the staircase 10 requires no attachment to any part of the structure to which it is connected. No attachment is made beyond the inner wall surface 20.

Figure 4:
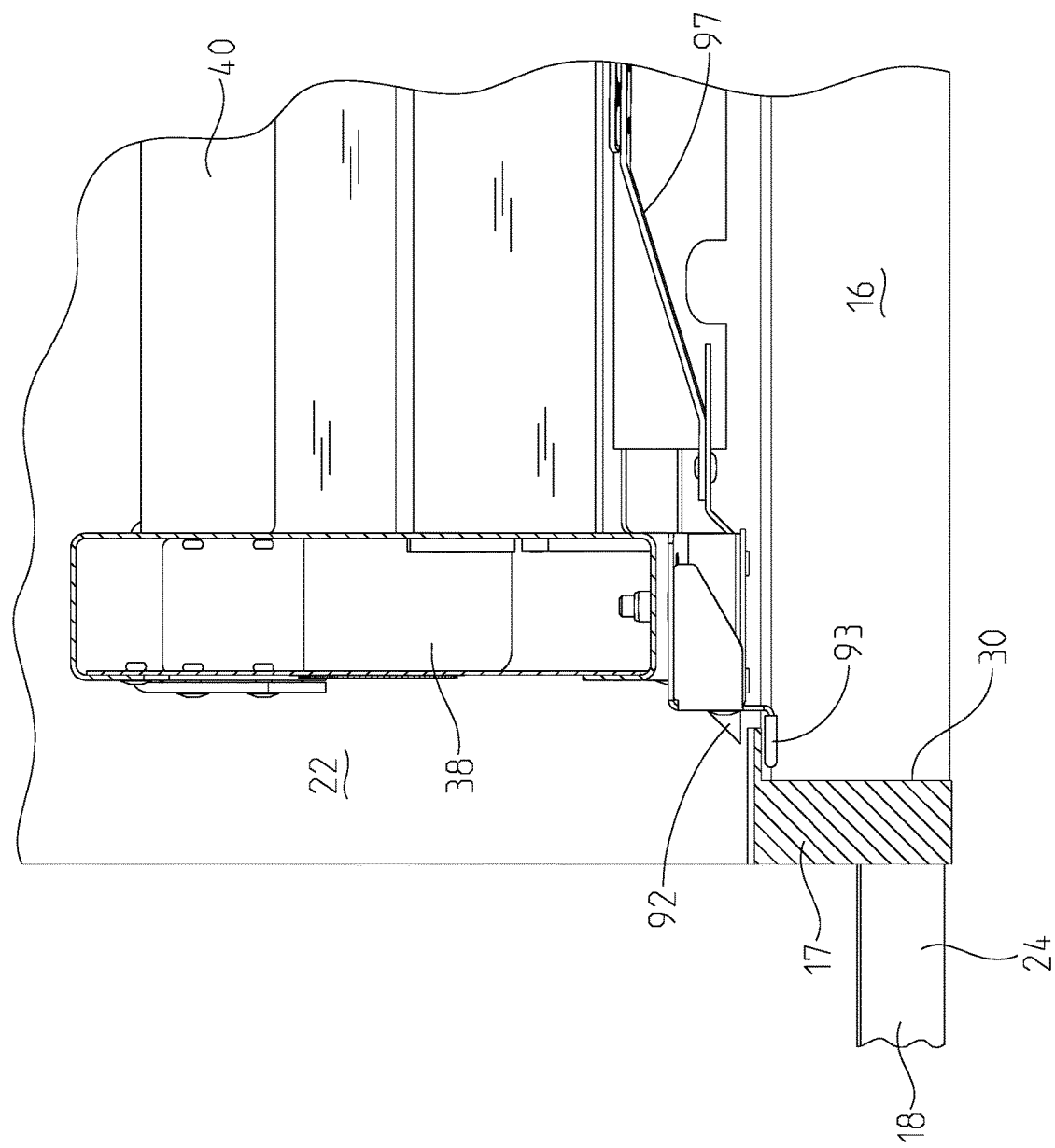
FIG. 4 is a sectional view taken about the line 4-4 in FIG. 3.
Figure 12:
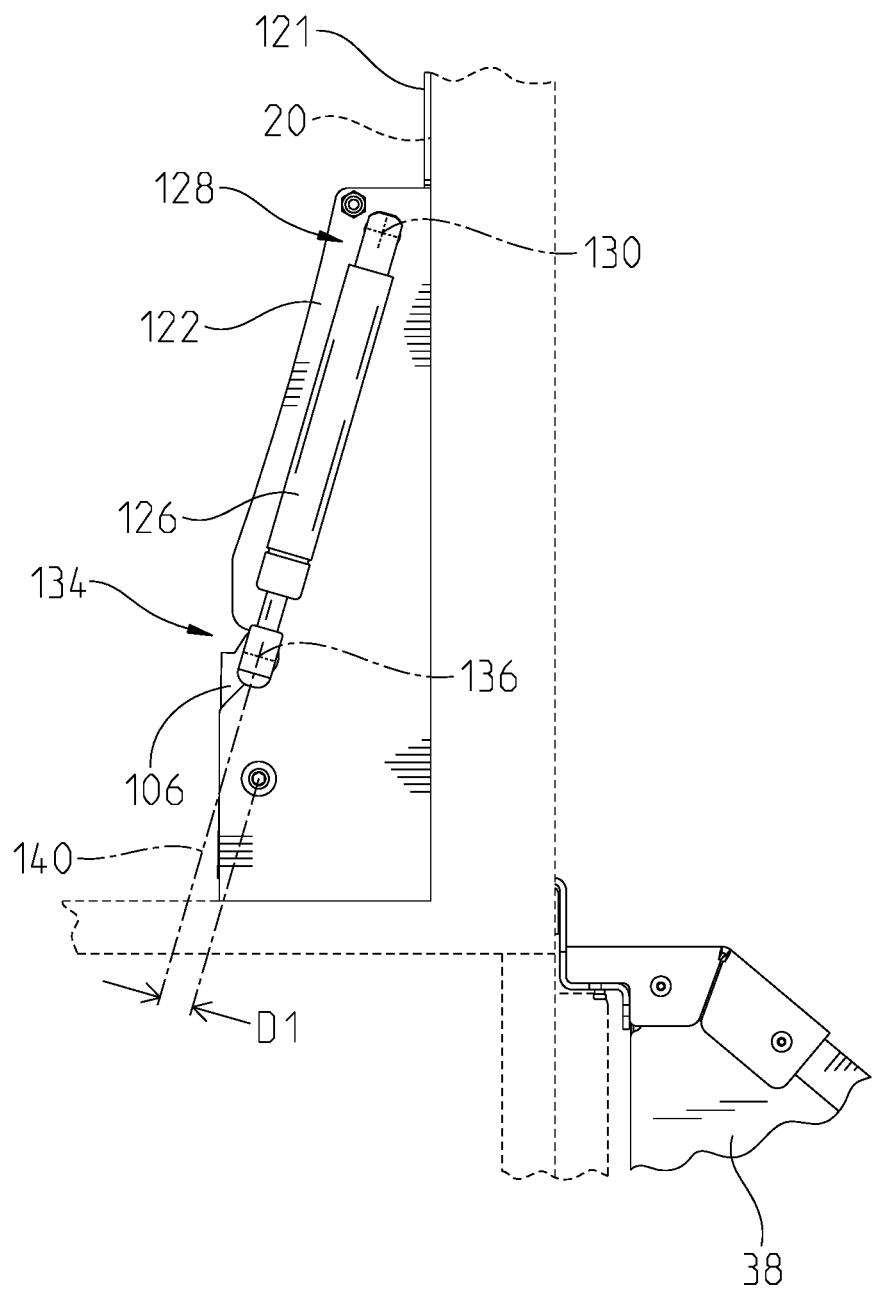
FIG. 12 is a side view of the staircase shown in FIG. 8 in the use position.
Figure 13:
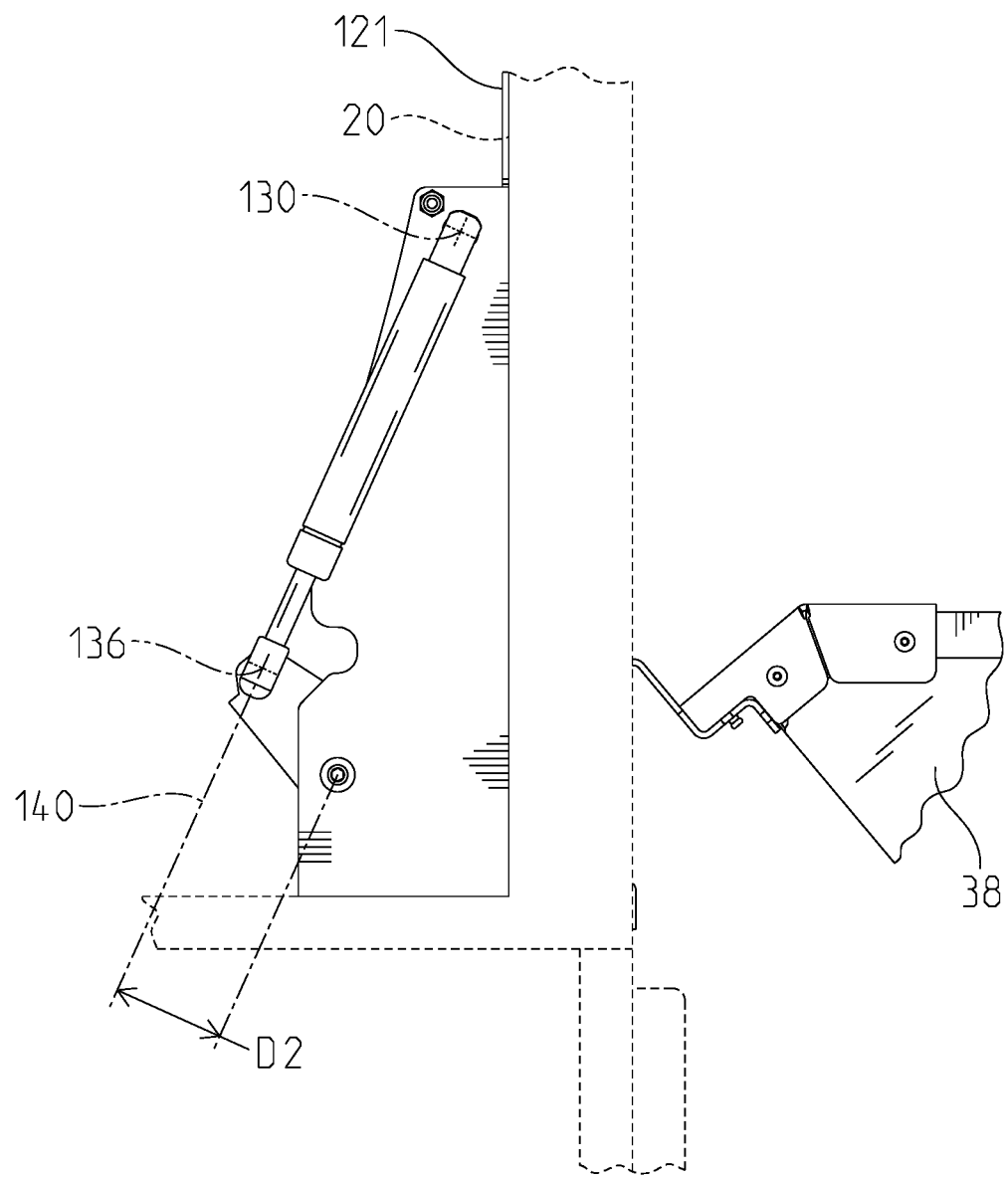
FIG. 13 is a side view of the staircase shown in FIG. 9 positioned between its use and stowed position.
Figure 14:
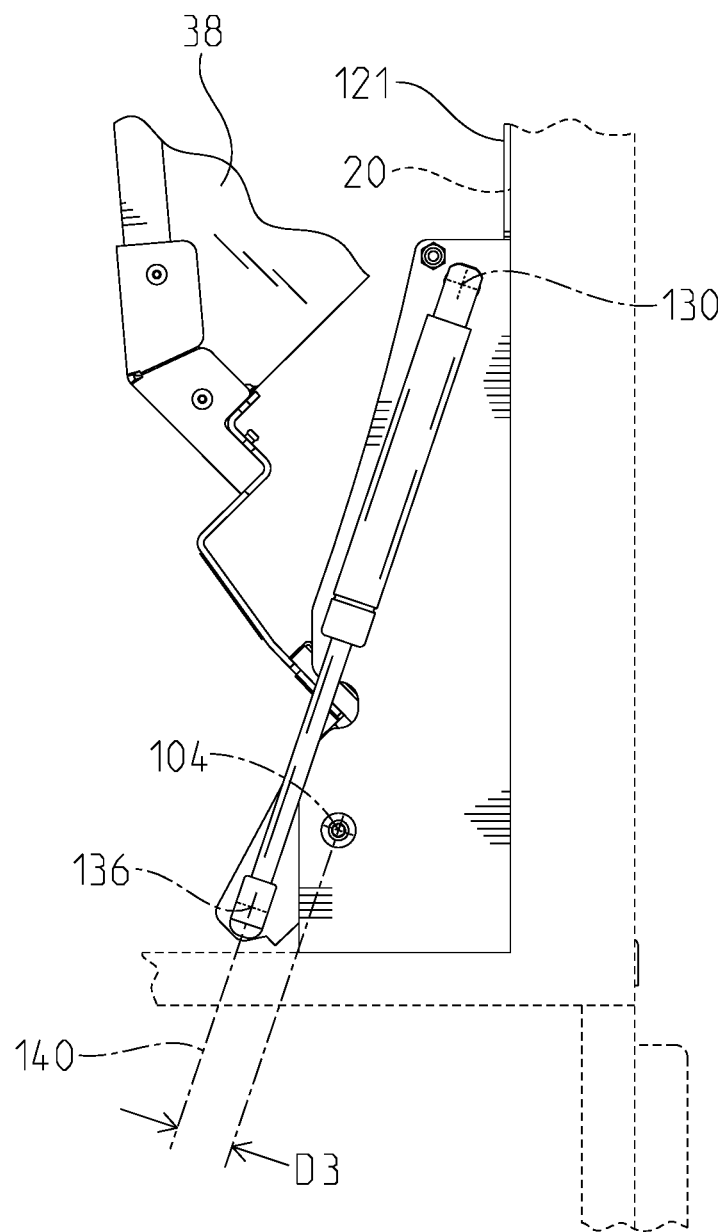
FIG. 14 is a side view of the staircase shown in FIG. 10 in its stowed position.
Figure 15:
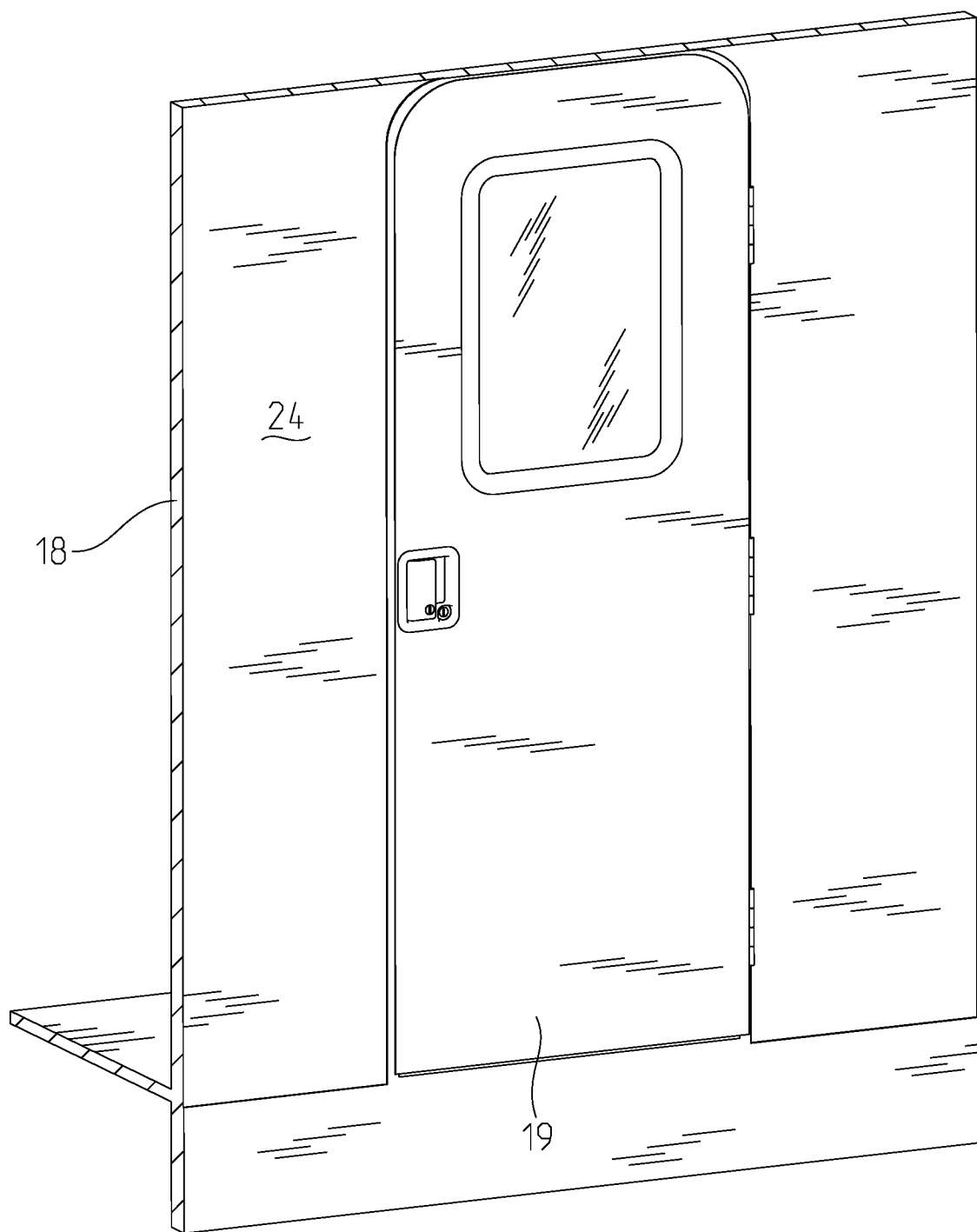
FIG. 15 shows the door closed with the staircase retracted behind the door.

A pair of gas springs 126 are connected between the second hinge flange 122 of the second mounting bracket 112 and the second hinge flange 106 of the threshold plate 102. The gas springs 126 straddle the second hinge flange 122 on the second mounting bracket 112 and the hinge flange 106 on the threshold plate 102. The gas springs 126 exert a force in a direction that extends their length. The gas springs 126 have a first end 128 pivotally connected at pivot point 130 located on the second hinge flange 122 of the second mounting bracket 112. This pivotally fixes the first end 128 and pivot point 130 with respect to the door opening 16. The gas springs 126 have a second end 134 pivotally connected at pivot point 136 on second hinge flange 106 of the threshold plate 102. Pivot point 136 is pivotally fixed with respect to the second hinge flange 106 on the threshold plate 102. Thus, the second end 134 and pivot point 136 move with respect to the door opening 16 as the threshold plate 102 pivots. The gas springs 126 work well for providing lifting assistance in the present invention because they have a relatively flat force curve when compared to other springs such as coil springs. Because the gas springs 126 straddle the hinge flanges 122 and 106, they do not exert a bending force on the flanges 122, 106 to which they are connected. Each spring 126 exerts a force along its line of action 140 that acts through the pivot points 130, 136. FIG. 12 shows the staircase 10 in its use position in which the pivotal feet 50 contact the ground. In the use position, the line of action 140 of the gas springs 126 is relatively near the pivot axis 104 of the threshold plate 102. The distance of the line of action 140 from the pivot axis 104 is shown as D1 in FIG. 12. When the line of action 140 is relatively near the pivot axis 104, the gas springs 126 do not exert a relatively strong moment on the staircase 10 via the threshold plate 102, and thus, the assistance to the user is relatively light. In the use position, the center of gravity 88 is relatively near the outer wall surface 24 and a large amount of assistance is not needed because a user does not bear a large portion of the weight of the staircase 10. As the staircase 10 is moved between the use and stowed position to a position where the staircase 10 is approximately perpendicular to the outer wall surface 24, the center of gravity 88 is at its farthest from the outer wall surface 24 and a user of the staircase 10 will bear a large portion of the weight to of the staircase 10. This position is shown in FIG. 13. In this position, the line of action 140 is relatively far from the pivot axis 104 of the threshold plate 102 and this provides a relatively high amount of assistance because the springs 126 generate a relatively large moment about the pivot axis 104 that urges the staircase 10 towards its stowed position. Hence the springs 126 are able to generate a large amount of assistance when a user of the staircase 10 would bear the most weight during lifting it. The distance between the line of action 140 and the pivot axis 104 when the staircase 10 is between its use and stowed positions is shown as D2 in FIG. 13. Distance D2 is the largest distance that the line of action 140 is from the pivot axis 104 and coincides with the position of the staircase 10 when the center of gravity 88 is farthest from the wall 18. Thus, the line of action 140 moves farther from the pivot axis 104 as the staircase 10 is rotated from its use position toward its stowed position for a portion of the pivotal movement. As the staircase 10 is further lifted towards its stowed position, again the line of action 140 moves relatively nearer the pivot axis 104. The relationship between the line of action 140 and the pivot axis 104 in the stowed position is shown as D3 in FIG. 14. As such, relatively little biasing rotative force is provided near the stowed position because assistance is not needed. As shown in FIG. 2, the center of gravity 88 will be inside the door frame 17, and in the case of the staircase 10 shown in FIGS. 6-11, the center of gravity 88 will be farther from the inner wall surface 20 than the pivot axis 104 of the threshold plate 102. As such, the staircase 10 will be biased inwardly under its own weight to rest on its stop brackets 93 as shown in FIG. 4. When the staircase 10 rests on its stop brackets 93, the gas springs 126 are designed to exert no biasing force. As such, in the event the gas springs 126 need to be changed, they may be easily removed without any need to compress the gas springs 126 to facilitate their removal. Throughout the entire movement of the threshold plate 102 from its use to stowed position, the gas springs 126 remain contained between the second hinge flange 106 on the threshold plate 102 and the hinge flange 122 on the second mounting bracket 112. Due to the fact that the hinge flanges 106 and 122 remain in the indoor space 22 at all times behind the inner wall surface 20, the gas springs 126 remain in the indoor space 22 at all times.

When a user of the staircase 10 shown in FIGS. 6-11 is ready to store the staircase 10, he will lift up near the lower end 48 of the staircase. As the staircase 10 is lifted, the gas springs 126 provide more assistance as the line of action 140 shifts from its relatively near position to the pivot axis 104 shown in FIG. 8 to its relatively far position shown in FIG. 9. The user of the staircase 10 will receive the most assistance when the staircase 10 is in the position shown in FIGS. 9 and 13. As such, the user of the staircase 10 will need to exert a relatively low and nearly constant force as the staircase 10 is moved from its use position to its stowed position.

The folding staircase 10 and lifting device are designed so that no part of the lifting device is within the door opening 16. In other words, no parts of the mounting brackets 110, 112 and the parts affixed thereto protrude within the space between the door jambs 30. This can be seen in FIGS. 6 and 7. Thus, the path through the door opening 16 is unobstructed by any parts of the staircase 10.

In the use position of the staircase 10, the threshold plate 102 extending to its inner edge 142 covers the mounting flanges 123, 125 and the cover 100 covers the lifting device 98 as shown in FIG. 7. Laterally, the threshold plate 102 covers the floor mounting flanges 123, 125 of the mounting brackets 110, 112 because the hinge flanges 105, 106 of the threshold plate 102 pivotally ride along the insides of the hinge flanges 118, 122 of the mounting brackets 110, 112. Thus, most of the mounting hardware and working parts associated with lifting the staircase 10 remain hidden with respect to a user of the staircase 10.

Figure 16:
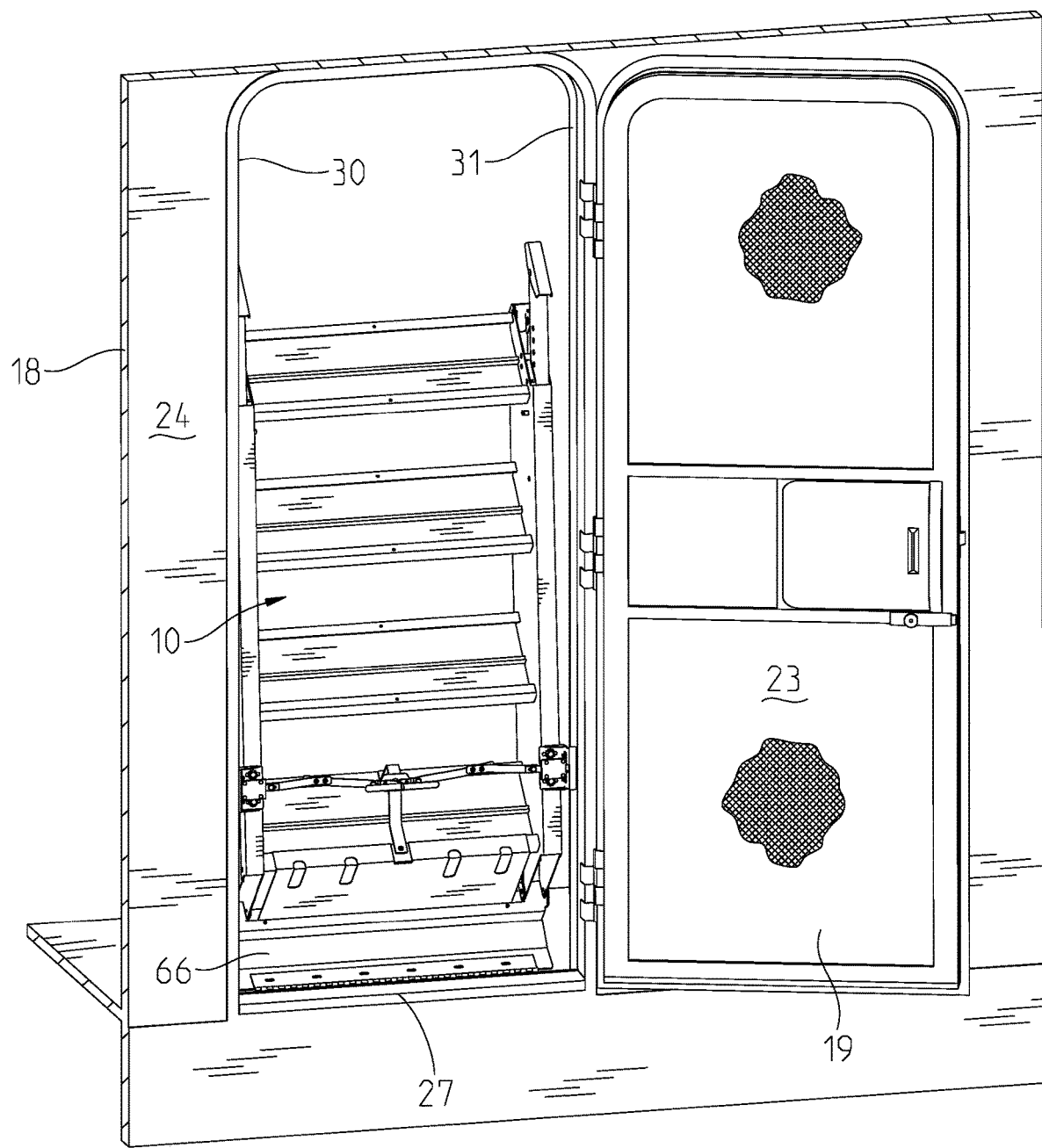
FIG. 16 shows the door open with the staircase shown in FIGS. 1-5 in the stowed position within the door opening.
Figure 17:
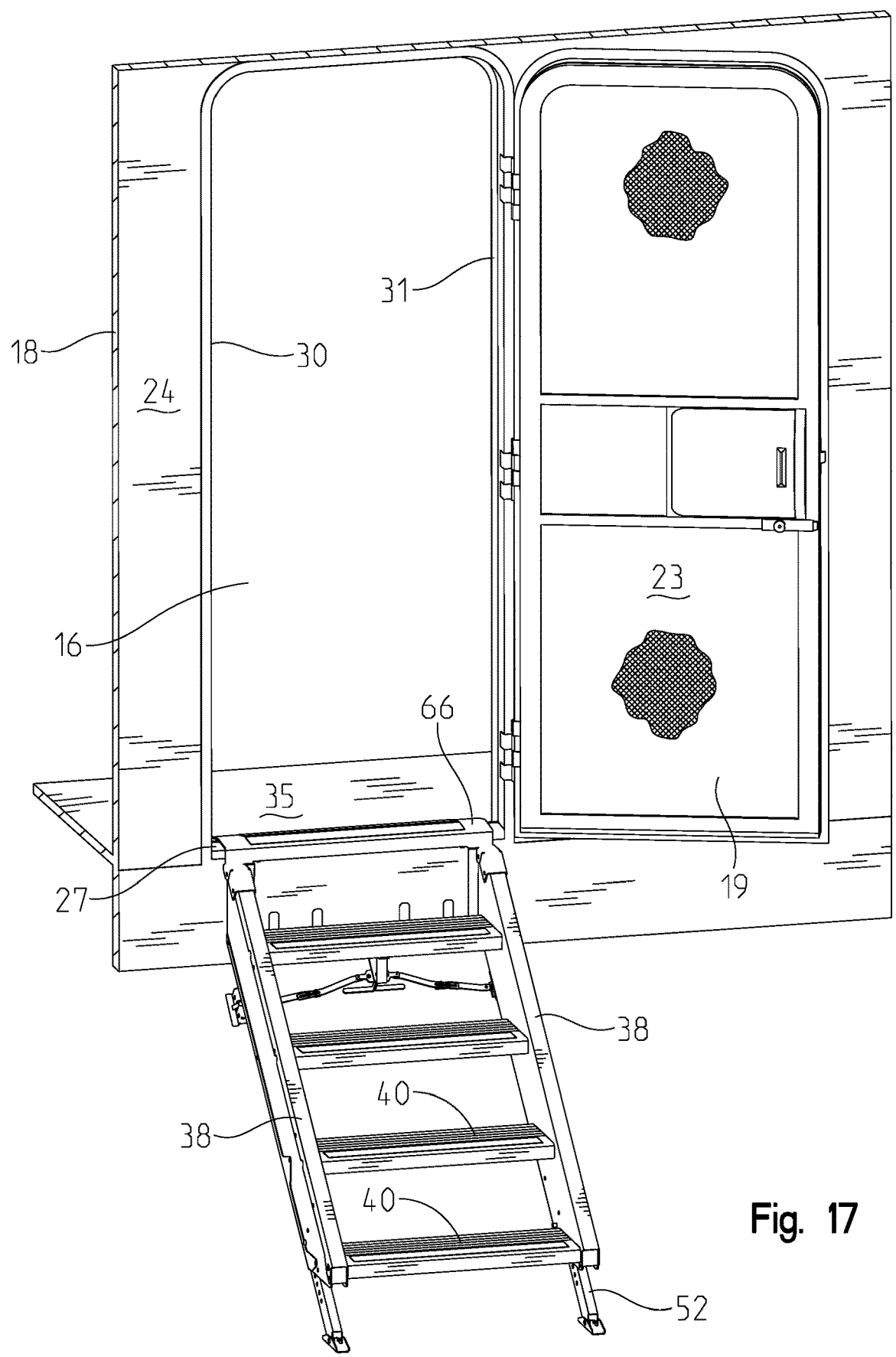
FIG. 17 shows the staircase in FIG. 16 in its use position with the door open.
Figure 18:
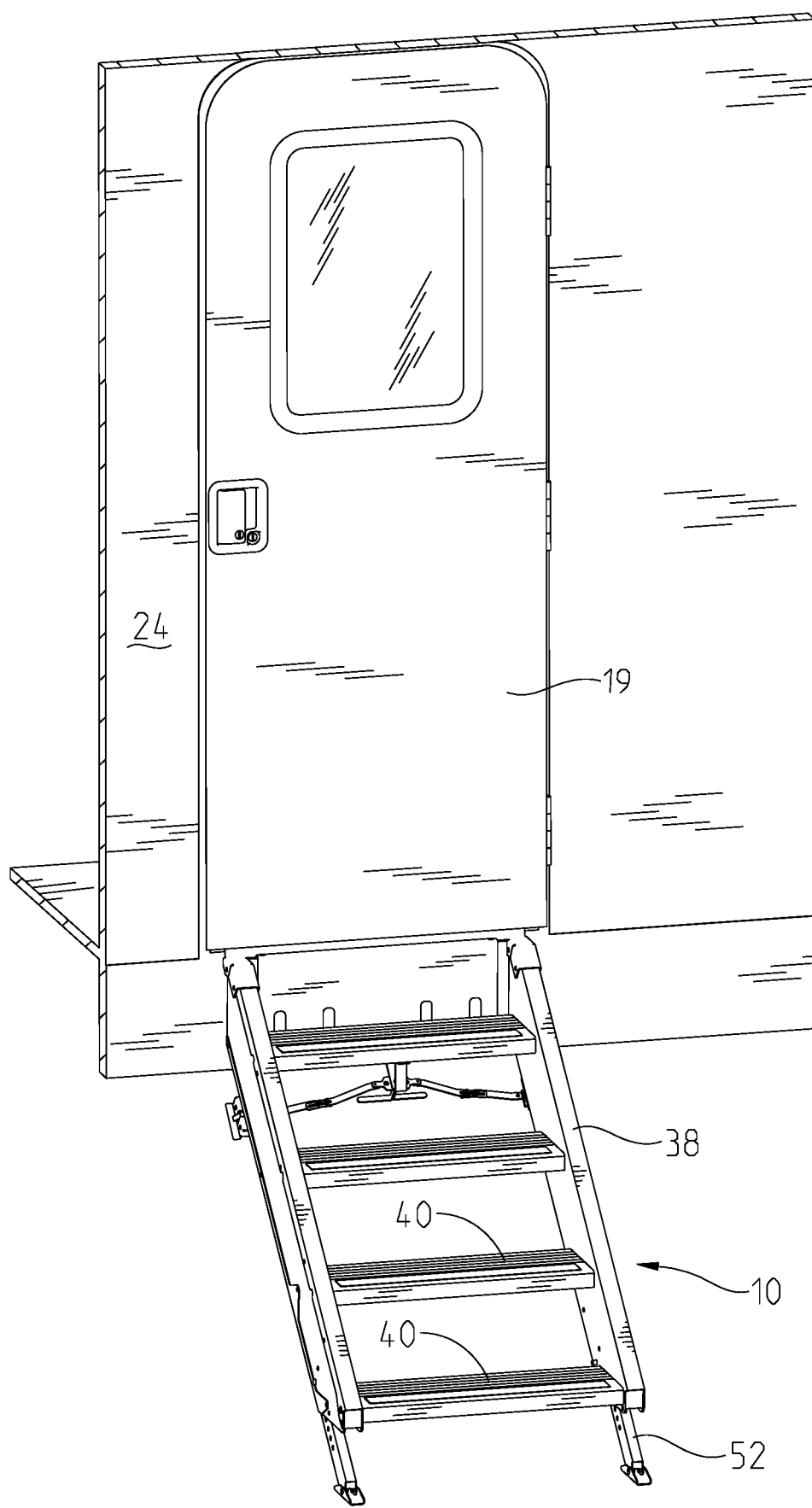
FIG. 18 shows the staircase in FIG. 17 shows the staircase of FIG. 17 in its use position with the door closed over the threshold plate.
Figure 19:
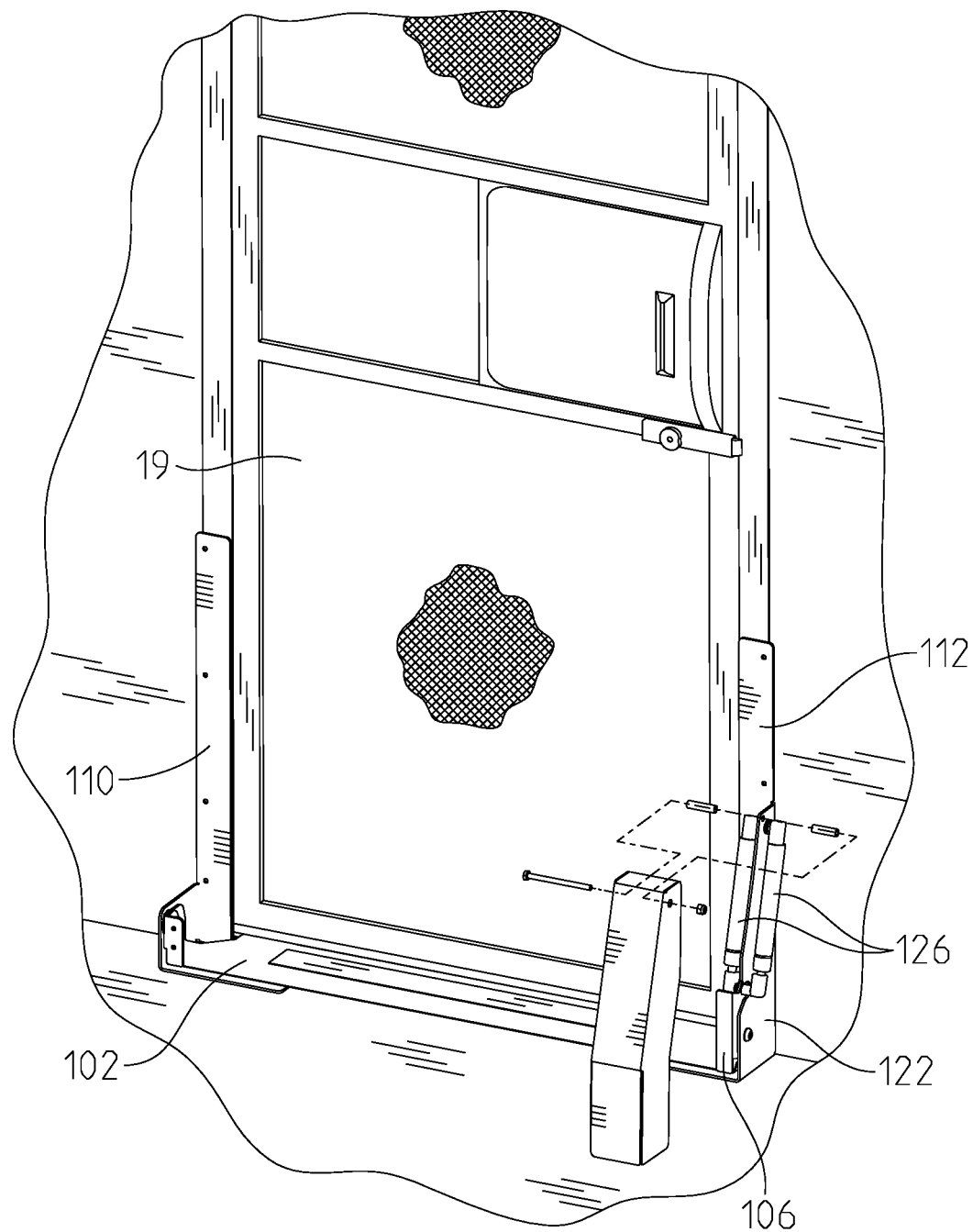
FIG. 19 shows the staircase shown in FIGS. 6-14 in its stowed position completely within the indoor space behind the door, with the door in its closed position as viewed from behind.
Figure 20:
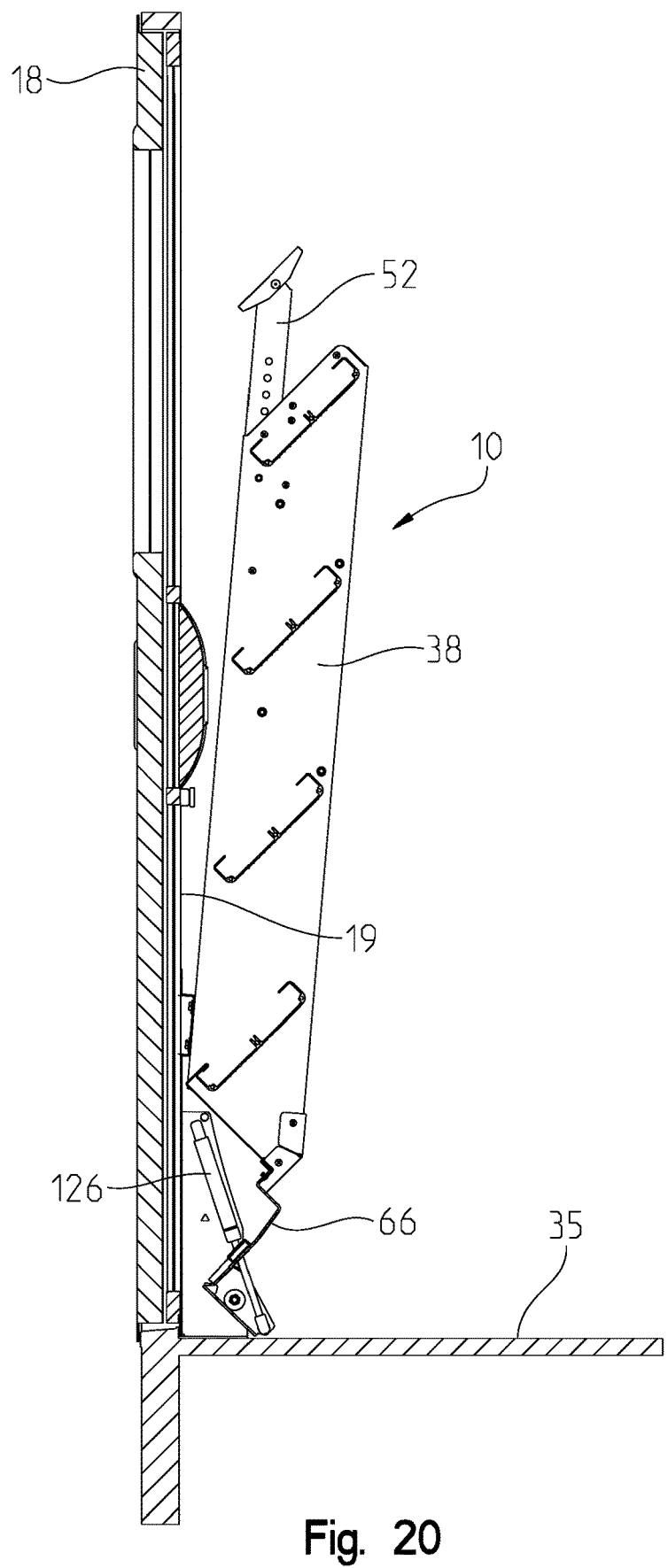
FIG. 20 is a sectional view of the staircase in 19 with the door in its closed position.

The working parts of the staircase 10 are designed to allow operation of the door 19 when the staircase 10 is in either its use or stowed position. In FIG. 16, the staircase 10 is shown in its stowed position. With the door 19 open, and with the door 19 remaining open, the staircase 10 may be moved to its use position shown in FIG. 17. Once the staircase is in its use position, the door 19 may be closed over the threshold plate 66 as shown in FIG. 18. The staircase 10 shown in FIGS. 16-18 uses the unassisted threshold plate 66 as shown in FIGS. 1-5. In the same way, the staircase shown in FIGS. 6-14 that is assisted allows the door 19 to close when the staircase 10 is in both its use and stowed position. FIG. 19 shows the door 19 closed over the threshold plate 102 from the indoor space 22 with the staircase and threshold plate 102 in their use position. FIG. 20 shows the staircase 10 in its stowed position with the door 19 in its closed position with the entire staircase and threshold plate 102 being located on the same side of the door as the mounting brackets 110, 112.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A folding staircase in combination with a door opening within a wall having an inner wall surface located within an indoor space having a floor, and an outer wall surface located in an outdoor space, said door opening including a threshold fixed with respect to said opening, and vertical door jambs, at least one of said vertical door jambs includes a door stop, said door opening for receiving a door that separates said indoor space from said outdoor space, said door movable between an open position locating said door outside of said opening and a closed position that locates said door within said opening, said folding staircase comprising:

a pair of stringers spanned by a tread, said staircase having a lower end adapted for contacting a ground surface;

a hinge affixed to said stringers, said hinge having a floor mounting portion adapted for being mounted completely within said indoor space and a threshold plate that is pivotally affixed to said floor mounting portion, said hinge pivoting about an axis and said axis located above said floor, said threshold plate having a use position wherein said threshold plate overlies said threshold and spans said door opening and a stowed position wherein said threshold plate is located within said indoor space;

said door being movable between said open and closed positions when said threshold plate is in said use position and said door being movable between said open and closed positions when said threshold plate is in its stowed position, wherein said axis is located above said floor and below said threshold, at least one of said stringers contain a stop bracket and said stop bracket for contacting said door stop when said staircase is in said stowed position, said stop bracket for restraining further movement inward of said staircase when said staircase is in said stowed position.

2. The staircase of claim 1, wherein said staircase has a center of gravity and said center of gravity is located inwardly of said axis when said staircase is in said stowed position so that said staircase is biased into said stowed position.

3. The staircase of claim 1, further comprising a locking pin opposite one of said stop brackets and said locking pin shiftable between a locked position and an unlocked position, said locked position locating said locking pin behind a portion of said door opening.

4. The staircase of claim 2, wherein said locking pin is biased into said locked position.

* * * * *